US010620800B2

(12) United States Patent
Apokatanidis et al.

(10) Patent No.: US 10,620,800 B2
(45) Date of Patent: Apr. 14, 2020

(54) INTEGRATED MOBILE SERVICE COMPANION (71) Applicant: INTERNATIONAL BUSINESS MACHINES CORPORATION, Armonk, NY (US)

(72) Inventors: Dimitri Apokatanidis, Saint-Lambert (CA); Emmanuel Barajas Gonzalez, El Salto (MX); Jeffrey P. Brown, Strathroy (CA); Shaun E. Harrington, Sahuarita, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/628,937

(22) Filed: Feb. 23, 2015

(65) Prior Publication Data
US 2016/0246482 A1    Aug. 25, 2016

(51) Int. Cl.
*G06K 9/00* (2006.01)
*G06F 3/0484* (2013.01)
*G06F 3/147* (2006.01)

(52) U.S. Cl.
CPC .......... *G06F 3/04842* (2013.01); *G06F 3/147* (2013.01)

(58) Field of Classification Search
None
See application file for complete search history.

(56) References Cited

U.S. PATENT DOCUMENTS

| 6,941,539 | B2 | 9/2005 | Hammes | |
|---|---|---|---|---|
| 7,903,838 | B2 * | 3/2011 | Hudnut | A47J 37/00 382/100 |
| 8,860,760 | B2 * | 10/2014 | Chen | G09G 5/397 345/633 |
| 2004/0044295 | A1 * | 3/2004 | Reinert | A61B 34/20 600/587 |
| 2011/0054962 | A1 | 3/2011 | Xu et al. | |
| 2013/0032634 | A1 | 2/2013 | McKirdy | |
| 2015/0243013 | A1 * | 8/2015 | White | G09B 5/06 382/103 |
| 2016/0225010 | A1 | 8/2016 | Patel | |
| 2016/0342839 | A1 * | 11/2016 | Condel | G06K 9/00671 |

FOREIGN PATENT DOCUMENTS

WO    2014053048 A1    4/2014

\* cited by examiner

*Primary Examiner* — Fred H Hu
(74) *Attorney, Agent, or Firm* — Griffiths & Seaton PLLC (57) ABSTRACT

Various embodiments for performing services on hardware by use of a mobile user device incorporating a processor. Identifying information of the hardware is recognized. An appropriate action plan, based on the recognized hardware and any service history previously associated with the hardware, is selected. The selected action plan is verified against the hardware.

15 Claims, 7 Drawing Sheets

INTEGRATED MOBILE SERVICE COMPANION

BACKGROUND OF THE INVENTION

Field of the Invention

The present invention relates in general computing systems, and more particularly to, various embodiments for performing services on hardware using a mobile device.

Description of the Related Art

The world today has evolved to include a myriad of various kinds of machines in varying levels of complexity and interrelation with other machines in increasingly complicated networks. Computers, data storage devices and networks, communications equipment, appliances, vehicles, and hundreds of other examples typically incorporate increasing amounts of complexity, as, for example, the machines integrate computer processing devices and other technology. It is anticipated that the variety of machines will continue to increase and evolve in complexity.

SUMMARY OF THE INVENTION

Various embodiments for performing services on hardware by use of a mobile user device incorporating a processor are provided. In one such embodiment, a method for performing services on hardware by use of a mobile device incorporating a processor is provided. Identifying information of the hardware is recognized. An appropriate action plan, based on the recognized hardware and any service history previously associated with the hardware, is selected. The selected action plan is verified against the hardware.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Although today's world is largely digitized, a fundamental need remains for service personnel. Without these individuals supporting the physical infrastructure, which is essentially comprised of machinery of increasing complexity, it would be impossible to enjoy the technologies that are taken for granted every day. A continuing challenge, in such a progressively innovating and demanding world, is the ability of the service personnel to stay abreast of changes in procedures, technology, and the like, as well as obtaining new skills in order to service and repair all of the aforementioned machines. Training courses require time away from work and travel allowances, which incur cost. Self-paced learning, alternatively, is strictly theoretical, and does not provide assistance without direct engagement. Even still, self-directed learning may lack the conceptual training typically sought.

There currently is no efficient way for such service personnel to stay current with every single technological advent and product detail needing to be supported. Even in the situation of well-trained service professionals, there is still no substitute for experience, which typically takes a lengthy amount of time to develop. The aforementioned scenario has caused onsite support abilities to potentially decay, as previously, experienced engineers would typically arrive onsite to resolve issues. Currently, however, the experienced engineer may remain at home or at their place of business, while hoping to communicate the required service instructions to an individual on site. While this methodology has yielded results, there is also an attendant possibility for errors caused by the potential lack of experience or judgment of someone lacking complete knowledge and understanding of the job at hand.

To address the need for functionality to transfer experience, knowledge, and skillset quickly to onsite personnel or others who are in immediate need, the mechanisms of the illustrated embodiments allow for the quick and immediate correlation between what particular machine a user may be working on at any particular time, and the immediate needs to be accomplished. By simply imputing, for example, a machine's serial number, the mechanism of the illustrated embodiments can predict an appropriate action plan needed to repair the machine at hand.

Once an action plan is selected, the mechanisms of the illustrated embodiments then move through the selected action plan with the user on a step-by step basis, and furthermore, actually verify the proper steps have been taken within the action plan.

Consider the following example. If a step relates to changing internal components of a particular machine, the mechanisms of the illustrated embodiments may, for example, display on a mobile device, a diagram for the machine's proper internal setup. The mechanisms may then offer the user a verification option where the user may then take a picture, and the mechanisms of the illustrated embodiments verify the image taken against the pre-stored diagram. From this point forward, the mechanisms of the illustrated embodiments may continue this verification process by proceeding through the entire action plan with periodic verification checks when possible for each step to help ensure that the entire support procedure is performed as accurately as possible. This allows the user in the field to possess a reliable methodology of resolving the issue at hand without having, for example, the need to rely heavily on education beforehand.

Figure 1:
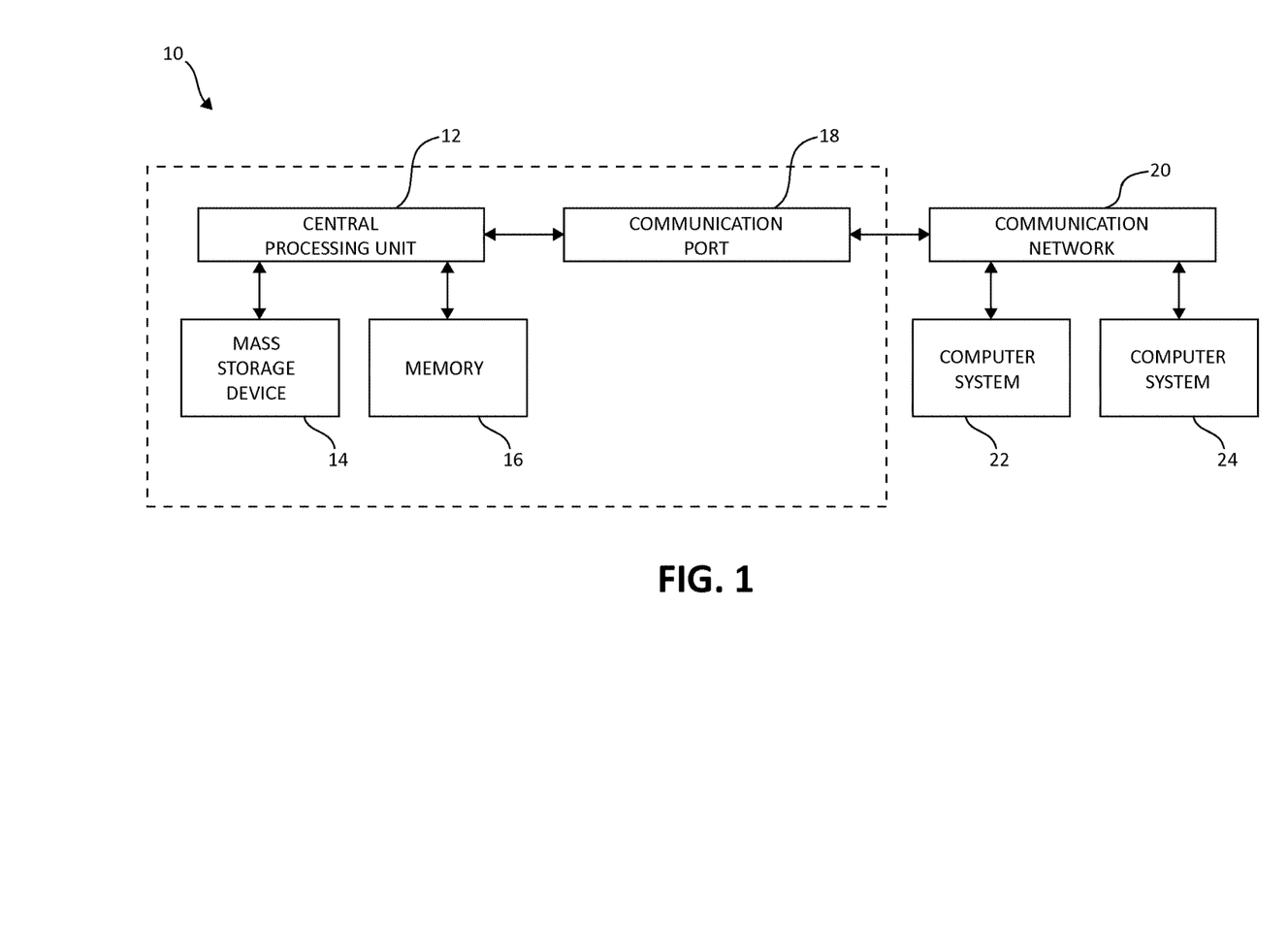
FIG. 1 is an exemplary block diagram showing a hardware structure for performing hardware support and service functionality, in which aspects of the present invention may be realized.

Turning now to FIG. 1, exemplary architecture 10 of a computing system environment is depicted. Architecture 10 may, in one embodiment, be implemented at least as part of a system for effecting mechanisms of the present invention. The architecture 10 includes central processing unit (CPU) 12, which is connected to communication port 18 and memory device 16. The communication port 18 is in communication with a communication network 20. The communication network 20 and storage network may be configured to be in communication with server (hosts) 24 and storage systems, which may include storage devices 14. The storage systems may include hard disk drive (HDD) devices, solid-state devices (SSD) etc., which may be configured in a redundant array of independent disks (RAID). The operations as described below may be executed on storage device (s) 14, located in architecture 10 or elsewhere and may have multiple memory devices 16 working independently and/or in conjunction with other CPU devices 12.

Memory device 16 may include such memory as electrically erasable programmable read only memory (EEPROM) or a host of related devices. Memory device 16 and storage devices 14 are connected to CPU 12 via a signal-bearing medium. In addition, CPU 12 is connected through communication port 18 to a communication network 20, having an attached plurality of additional computer host systems 22 and 24. In addition, memory device 16 and the CPU 12 may be embedded and included in each component of the architecture 10. Each storage system may also include separate and/or distinct memory devices 16 and CPU 12 that work in conjunction or as a separate memory device 16 and/or CPU 12.

As will be further described, architecture 10 may be incorporated into a variety of user devices that enable a user in the field to perform service operations on various machines. In one embodiment, the user device is a mobile device that the user may transport in a convenient manner to the site where the machine under service is located. As one of ordinary skill in the art will appreciate, the user device incorporating architecture 10 may include a wide variety of devices, such as laptop computers, tablets, smartphones, and the like.

Figure 2:
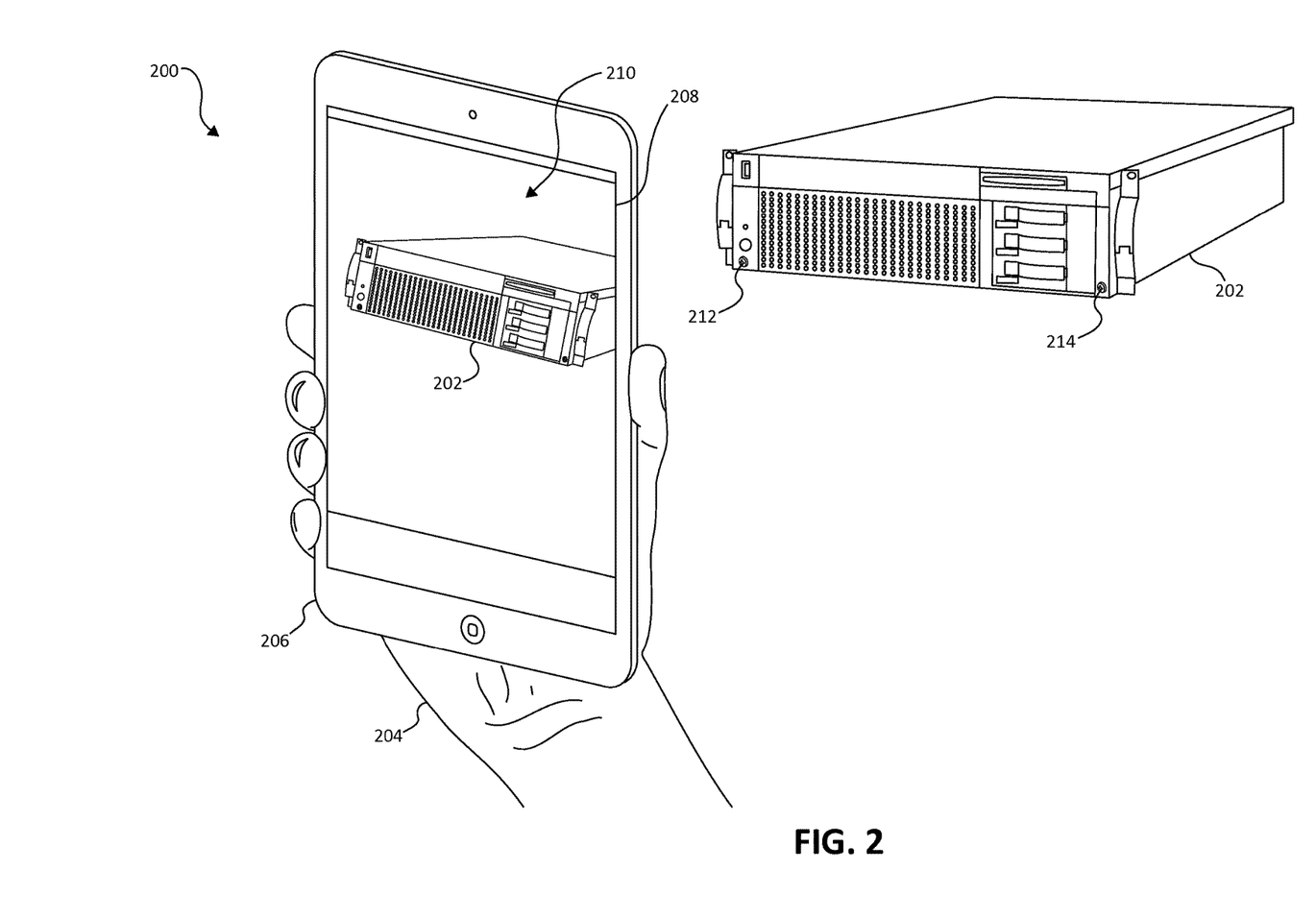
FIG. 2 is an illustration of hardware support functionality that is facilitated by the mechanisms of the present invention, here showing hardware identification functionality among other features.

FIG. 2 illustrates, in one embodiment, exemplary hardware support functionality 200 in accordance with various aspects of the present invention. Here, server hardware 202 is depicted as an example of a machine needing to undergo service and/or repair. As will be further explained, the server hardware 202 includes screws 212 and 214, which may, for example, secure a front plate covering a service area of the hardware 202. User 204 holds a mobile user device 206. The user device 206 includes, among other aspects, a graphical user interface (GUI) screen 208 as shown.

In one embodiment, the user 204, at arrival at a particular site, may gain access to the user device 206, and begin the service process. The user 204 may have the option of taking a picture using an integrated camera of the user device 206 of the front of the hardware 202. Functionality 200 depicts the user taking this aforementioned graphical representation 210 of the front of the hardware 202.

Once the graphical representation 210 is obtained of the hardware 202, the mechanisms of the present invention, in one embodiment, may use pattern recognition functionality to recognize and identify the particular device in a database of hardware that has been matched with various graphical patterns. The user device 206 may also recognize a serial number of the hardware 202 for recording, or to associate with warranty or particular service information, for example. In an alternative embodiment, the user 204 may have the option of skipping the functionality 200 and manually inputting a serial number or other identifying information into the user device 206.

The user device 206 may implement a variety of recognition functionality to identify a particular hardware device. For example, the user device 206 may recognize the hardware 202 using electronic, photographic, optical character recognition (OCR), bar code, radio frequency identification (RFID), magnetic stripe, smart card, and biometric data among other means.

Once this process is complete, the mechanisms of the illustrated embodiments may, for example, reference all open problem cases associated with the identified serial number or other identifying information. Taking the assumption that more than one problem case is identified, and/or more than one possible course of action is determined, the mechanisms may then begin the process of choosing an appropriate action plan (perhaps with the assistance of the user 204) to be carried out on the hardware 202. In an alternative embodiment, the user 204 may also have the option of arriving onsite with a predetermined action plan set on the mobile user device 206 to be carried out on the hardware 202.

Upon selection (automatically by the user device 206, and/or by manual assistance by the user) of the appropriate action plan, the user 204 then begins the process of carrying the action plan out. If, for example, invasive work is needed on the hardware 202, the mechanisms of the illustrated embodiments may begin with the presentation, to the user 204, of a graphical illustration/diagram/picture demonstrating how the particular hardware is opened.

Figure 3:
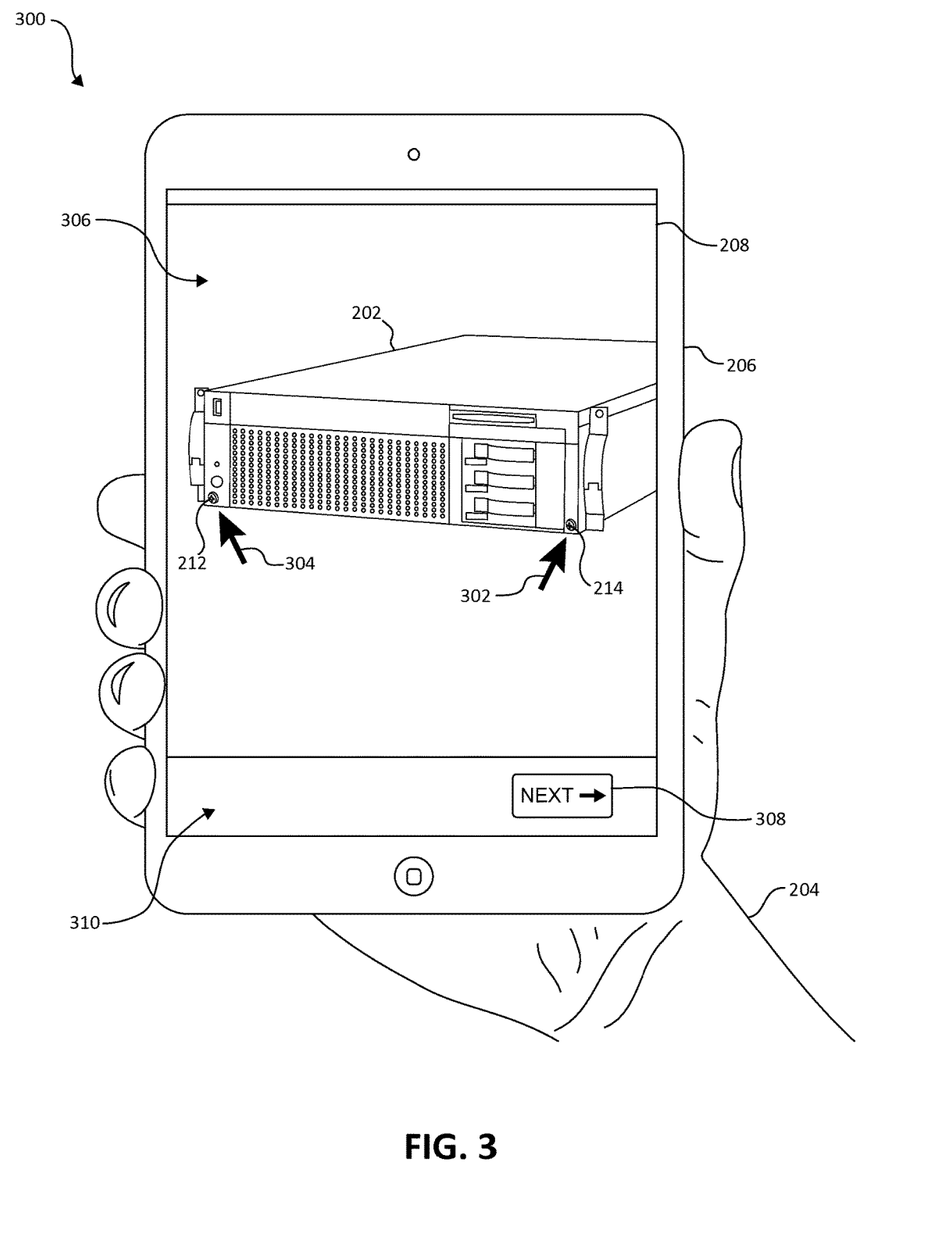
FIG. 3 is an additional illustration of hardware support functionality, here showing graphical overlay functionality to support user repair among other features, in which aspects of the present invention may be realized.

In addition, in one embodiment, the user 204 may be presented the option of continuing the service operation by referencing the aforementioned graphical illustration for assistance and proceeding in a manual mode of operation. In another embodiment, the user 204 may be presented with an option for proceeding in an "augmented reality" mode. Turning now to FIG. 3, such an augmented reality mode 300 is depicted, here showing the previous example of hardware 202, with screws 212 and 214, and user 204 holding user device 206 with GUI screen 208.

In one embodiment, the user device 206 recalls the graphical representation 210 (FIG. 2) for use in one or more successive steps. In other embodiments, the user device 206 may query the user 204 to position a camera of the user device 206 in a certain manner, such that the appropriate graphical representation 306 is obtained to perform certain service steps on the hardware 202. Once the appropriate graphical representation 210, 306 is obtained, the mechanisms of the illustrated embodiments overlay the representation 210, 306, as an additional graphical representation, information pertinent to the service step at hand. Overlay portion 310 of display 306, as well as overlaid arrows 302 and 304 as shown, represent at least a part of this graphical overlay functionality. Inclusive in this graphical overlay is the next button 308, which allows the user 204 to proceed to the next service step.

By using the augmented reality functionality, the user 204 is able to access near-instantaneously, a vast knowledgebase of information pertaining to a specific service course of action. In the illustrated augmented reality example 300, arrow overlays 302 and 304 indicate to the user that there are two screws 212 and 214 that are to be removed from the front of the hardware 202 as shown. In other embodiments, other graphical representations such as labels may be used. In other embodiments, other sensory cues such as sounds may be provided to the user. Each of the augmented reality functions is specifically tailored to the specific task in the selected action plan step at hand.

Figure 4:
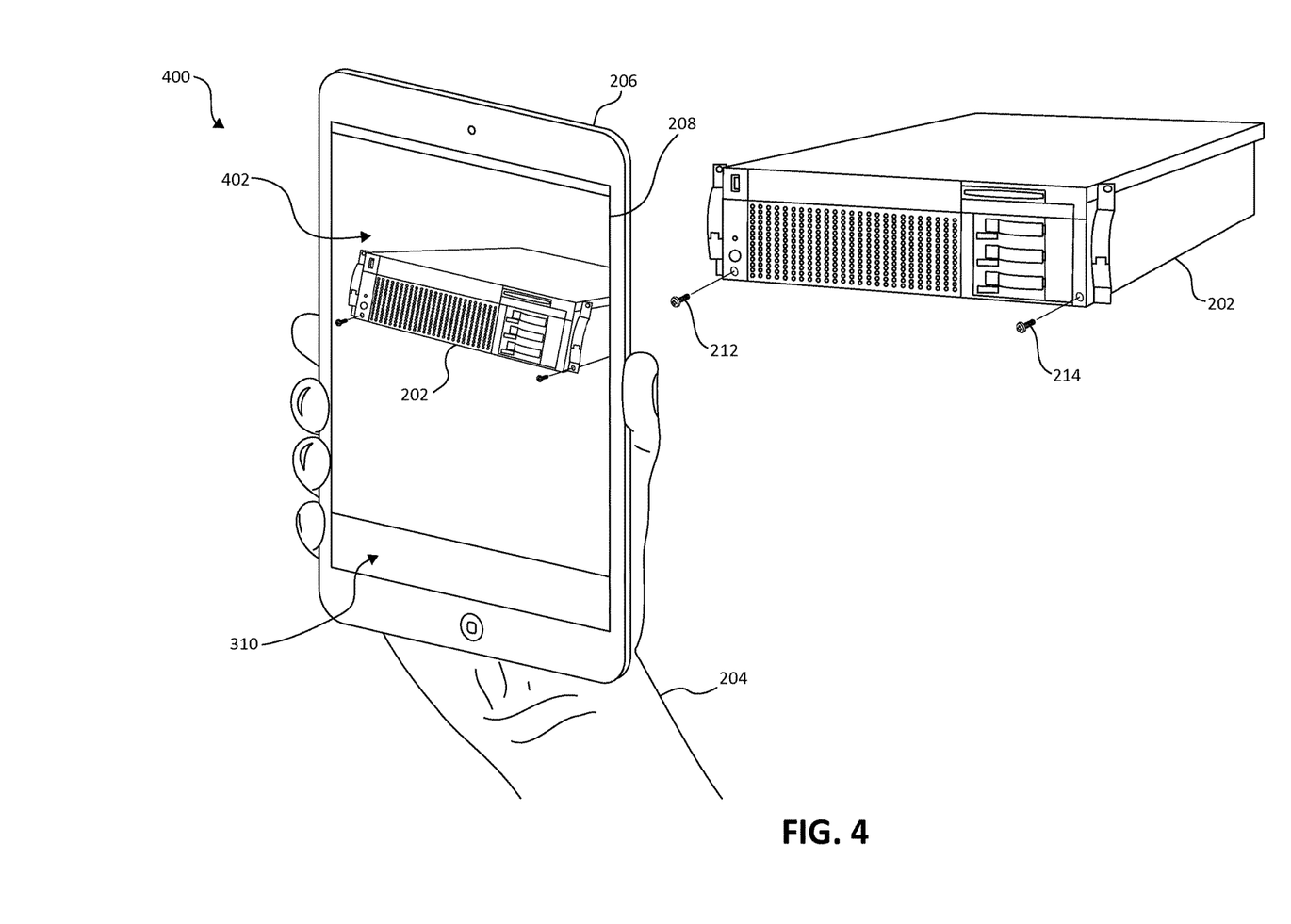
FIG. 4 is an additional illustration of hardware support functionality, here showing the user repair previously illustrated in FIG. 3 in a succeeding support step, here again in which aspects of the present invention may be realized.

As shown, the next button 308 allows the user 204 to proceed to the successive step in the respective action plan. In another embodiment, verification functionality may follow completion of a task in the action plan. Such verification may, for example, proceed in the illustrations shown in FIGS. 4 and 5, following.

Turning first to FIG. 4, here again the hardware 202 with screws 212 and 214 is shown. In the instant depiction 400, however, the screws have been subsequently removed by the user 204, who is now positioning the user device 206 and screen 208 to obtain an additional image/graphical representation 402 of the hardware 202 with the removed screws 212, 214. Here again, overlay 310 is shown for reference.

Figure 5:
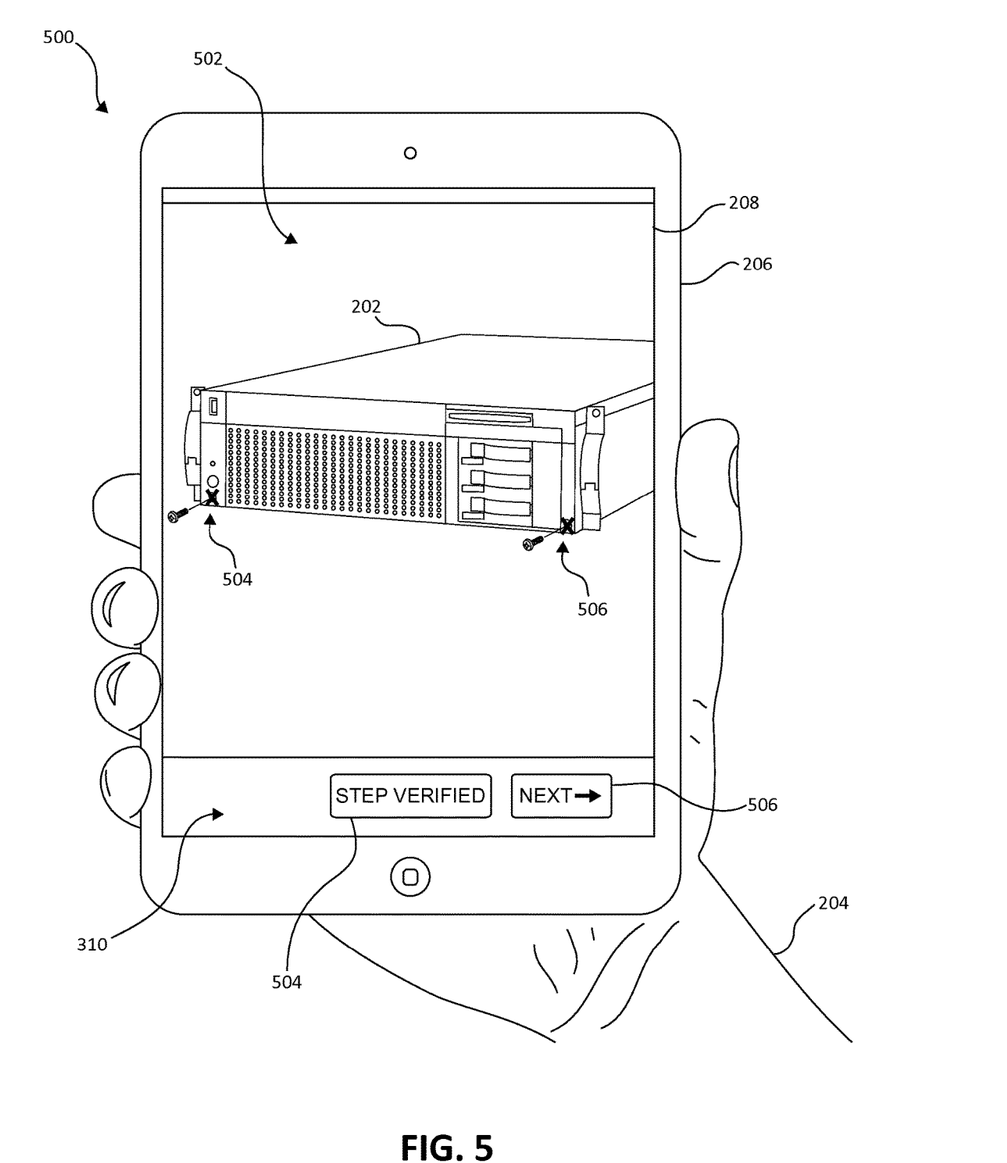
FIG. 5 is an additional illustration of hardware support functionality, here showing a successive, verification step in the user repair previously illustrated in FIGS. 3 and 4.

Proceeding now to FIG. 5, following in illustration 500, the user 204 is viewing the user device 206 with screen 208 to view the verification step. Here, the mechanisms of the present inventions may, for example, compare the graphical representation 402 taken by the user 204 with a stored graphical representation to determine if the step has been successfully completed. Overlay graphics 504 and 506 indicate to the user 204 that the correct screws have been removed in display 502, as well as the notification 504 in the overlay portion 310 that the step has been verified. The user 204 is then given the option to select the next button 506 to proceed to the next step of the action plan. It should be noted that not all steps in a particular action plan may be verifiable in this manner, as the graphical elements in a particular hardware service scenario may not have changed from a particular step to a particular successive step. However, as previously mentioned, other cues may be provided to the user, such as sounds or visual cues such as messages appearing on the hardware 202 and/or elsewhere. In this manner a variety of cues, graphically oriented or otherwise, may be provided to assist the user 204 in performing each of the steps in the specified action plan.

In one embodiment, upon completion of the action plan in its entirety, the mechanisms of the present invention may then provide the user 204 an opportunity to have information, such as a note, stored in the problem record of the hardware 202 as having been completed or failed. For example, the mechanisms may notate a particular problem record with "completed," as well as a particular date and time completed. Alternatively, the mechanisms may note the problem record with "failed" with the appropriate date and time, and/or afford the user 204 the option to begin the service process anew, or moving the problem record to the source where the action plan originated from. In addition, the mechanisms may afford the user 204 the ability to contact the source organization to obtain additional information.

Figure 6:
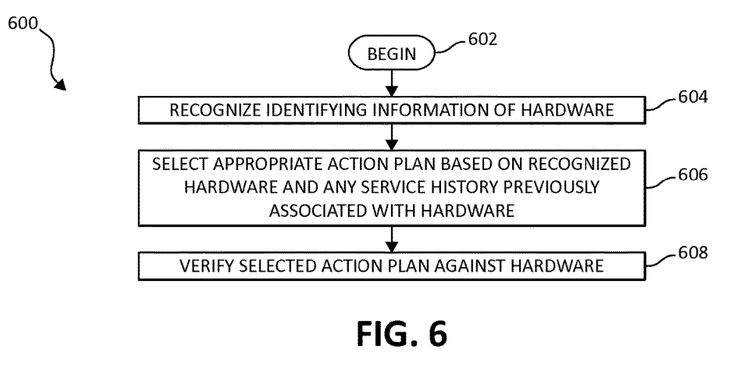
FIG. 6 is a flow chart diagram illustrating an exemplary method for performing services on hardware by use of a mobile user device incorporating a processor, again in which aspects of the present invention may be realized.

Turning now to FIG. 6, an exemplary method 600 is shown for performing services on hardware by use of a mobile user device incorporating a processor, in which various aspects of the present invention may be implemented. Method 600 begins (step 602) with the recognition of identifying information (e.g., graphical, numerical, OCR, combination, or otherwise) of particular hardware (step 604). An appropriate action plan is then selected based on the recognized hardware, and/or any associated service history previously recorded for the hardware (step 606). In a successive step, the selected action plan is verified (e.g., step-by-step, in entirety) against the particular hardware (step 608). The method 600 then ends (step 608).

Figure 7:
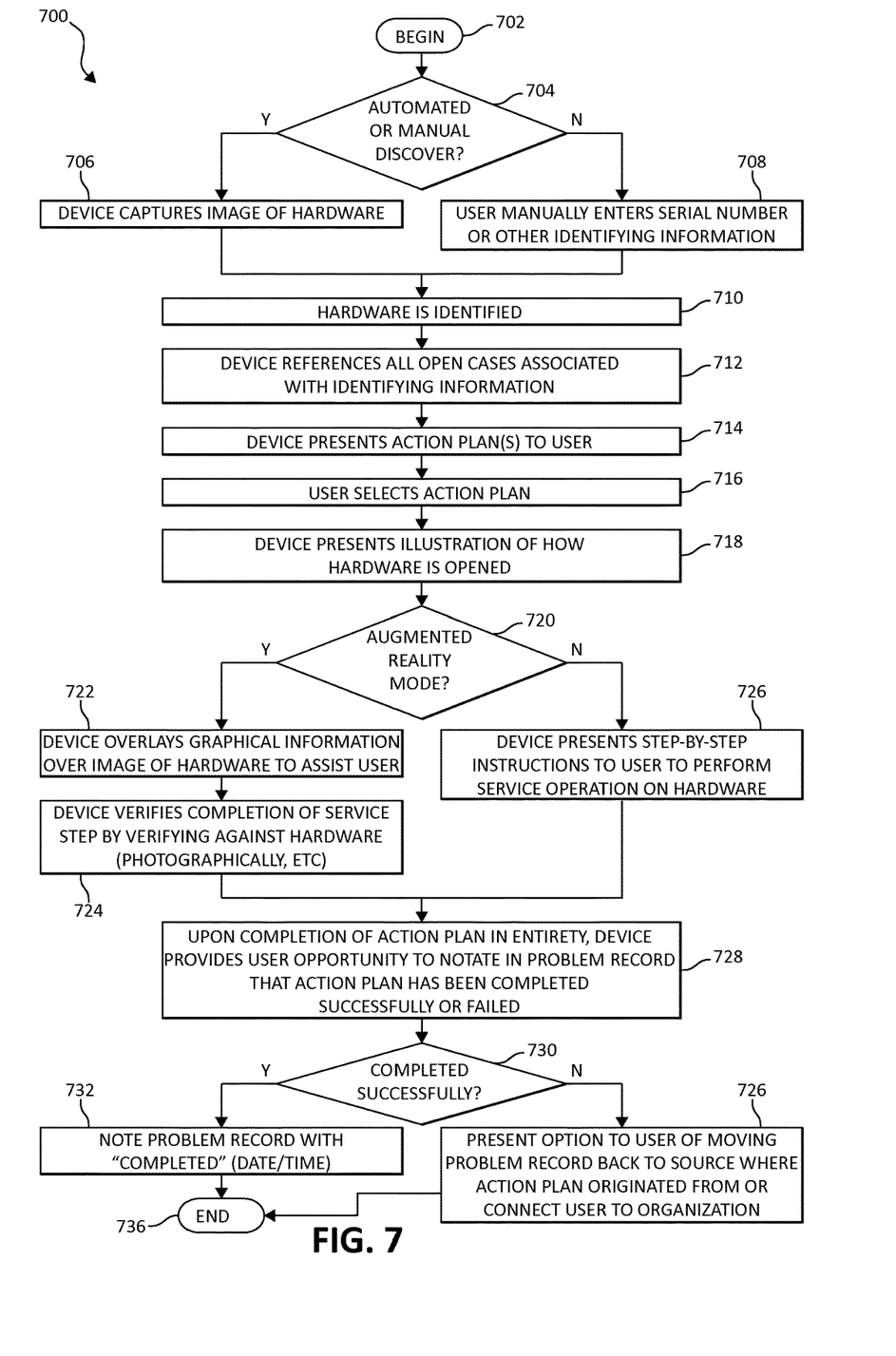
FIG. 7 is an additional flow chart diagram illustrating an additional exemplary method for performing services on hardware by use of a mobile user device, again in which aspects of the present invention may be implemented.

Method 700 in FIG. 7, following, illustrates in additional detail aspects of the present invention for performing hardware support by a mobile user device in view of the exemplary embodiments previously depicted. Here, method 700 begins (step 702), with a query as to whether the hardware will follow an automated or manual discovery process (step 704). If automated, the device captures an image of the hardware as previously described (step 706). If manual, the user enters a serial number, or other identifying information (step 708).

Once the identification process completes, and the particular hardware is identified (step 710), the user device references all open cases associated with the identifying information that was provided by the user (step 712). The device then presents one or more action plans to the user (step 714), in which the user selects an appropriate plan (step 716). The device then presents one or more illustrations of how the hardware is to be opened (step 718).

Continuing to decision step 720, a query is made as to whether to enter augmented reality mode. If no, the device continues by presenting step-by-step instructions to the user to perform the appropriate service operation(s) on the hardware per the selected action plan (step 726). If yes, the device overlays graphical information of image(s) of the hardware to assist the user (step 722), and verifies completion of a particular service step by verifying images provided by the user against stored graphical information or otherwise (step 724).

Upon completion of the appropriate action plan in its entirety, the device then provides the user an opportunity to notate in the problem record that the action plan has been completed successfully or failed (step 728). If the action plan has been completed successfully (decision step 730), the problem record is notated with "completed" as well as a corresponding date and time (step 732). Alternatively, if the action plan failed in some respect, the option is presented to the user of moving the problem record to the source where the action plan originated and/or connecting the user with the associated organization responsible for the plan (step 726). The method 700 then ends (step 736).

The mechanisms of the present invention allow for a quick and accurate action plan assignment and follow through. By identifying by way of a hard set number on the device (serial number) and then smartly identifying the action plan/plans that are associated with that device, the mechanisms allow users in an efficient manner not only what to do to service hardware, but also how to complete the service at hand.

Additional benefits of the mechanisms of the illustrated embodiments may come in the form of part number identification by way of augmented reality as well as quick part ordering if deemed necessary on site, servicing videos and how to info on hand could be easily referenced on site. In addition, all reference materials typically needed can now be encapsulated in a one touch device, such that if all else fails the user has a reliable and accurate source of information, and also a means of connection to knowledge resources that drafted the action plans.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for performing services on hardware by use of a mobile user device incorporating a processor, the method comprising:
   recognizing identifying information of the hardware using the mobile user device, the mobile user device being separate from the hardware and the hardware being computer hardware;
   selecting an appropriate action plan based on the recognized hardware and any service history including repairs previously associated with the hardware; wherein selecting the appropriate action plan further includes presenting, to the user, a list of recommended action plans including any previous action plans, and whether the previous action plans were successfully completed or failed, on the recognized hardware; and verifying the selected action plan against the hardware by presenting, to the user via graphical user interface (GUI), an illustrative step-by-step methodology for performing the services according to the selected action plan; wherein the user provides feedback to the processor for moving to a successive step of the methodology such that the mobile user device queries the user to input photographic evidence of completion of a respective step of the methodology prior to allowing the user to move to the successive step so as to mitigate user error thereby ensuring the selected action plan is performed accurately, and wherein the photographic evidence comprises a photo taken of the hardware by the user with a camera of the mobile user device upon completion of the respective step of the methodology such that the photo displays a last-action taken by the user on the hardware which is automatically compared, without user input, to a pre-stored diagram to perform the verification, the positioning of the camera for taking the photo queried to the user as the user holds the mobile user device.

2. The method of claim 1, wherein recognizing the identifying information further includes recognizing, by electronic, photographic, or optical character recognition (OCR) means, at least one of a serial number, a bar code, a radio frequency identification (RFID), a magnetic stripe, a smart card, and biometric data to identify the hardware in a database associated with the mobile user device.

3. The method of claim 1, wherein recognizing the identifying information further includes recognizing, by photographic means, at least one physical identifying feature of the hardware using a pattern recognition process.

4. The method of claim 1, further including, pursuant to presenting the user the illustrative step-by-step methodology, performing an augmented reality function by photographically overlaying at least a portion of the illustrative methodology over at least a portion of an image of the hardware to assist the user in performing the services.

5. The method of claim 4, further including using the augmented reality function to assist in performing the verification of the action plan against the hardware by comparing at least a portion of hardware images against saved graphical information of the hardware in which the services have been performed.

6. A system for performing services on hardware by use of a mobile user device, comprising:
a processor, operational on the mobile user device, that
recognizes identifying information of the hardware using the mobile user device, the mobile user device being separate from the hardware and the hardware being computer hardware;
selects an appropriate action plan based on the recognized hardware and any service history including repairs previously associated with the hardware; wherein selecting the appropriate action plan further includes presenting, to the user, a list of recommended action plans including any previous action plans, and whether the previous action plans were successfully completed or failed, on the recognized hardware; and
verifies the selected action plan against the hardware by presenting, to the user via graphical user interface (GUI), an illustrative step-by-step methodology for performing the services according to the selected action plan; wherein the user provides feedback to the processor for moving to a successive step of the methodology such that the mobile user device queries the user to input photographic evidence of completion of a respective step of the methodology prior to allowing the user to move to the successive step so as to mitigate user error thereby ensuring the selected action plan is performed accurately, and wherein the photographic evidence comprises a photo taken of the hardware by the user with a camera of the mobile user device upon completion of the respective step of the methodology such that the photo displays a last-action taken by the user on the hardware which is automatically compared, with no user input, to a pre-stored diagram to perform the verification, the positioning of the camera for taking the photo queried to the user as the user holds the mobile user device.

7. The system of claim 6, wherein the processor, pursuant to recognizing the identifying information, recognizes, by electronic, photographic, or optical character recognition (OCR) means, at least one of a serial number, a bar code, a radio frequency identification (RFID), a magnetic stripe, a smart card, and biometric data to identify the hardware in a database associated with the mobile user device.

8. The system of claim 6, wherein the processor, pursuant to recognizing the identifying information, recognizes, by photographic means, at least one physical identifying feature of the hardware using a pattern recognition process.

9. The system of claim 6, wherein the processor, pursuant to presenting the user the illustrative step-by-step methodology, performs an augmented reality function by photographically overlaying at least a portion of the illustrative methodology over at least a portion of an image of the hardware to assist the user in performing the services.

10. The system of claim 9, wherein the processor uses the augmented reality function to assist in performing the verification of the action plan against the hardware by comparing at least a portion of hardware images against saved graphical information of the hardware in which the services have been performed.

11. A computer program product for performing services on hardware by use of a mobile user device having a processor, the computer program product comprising a non-transitory computer-readable storage medium having computer-readable program code portions stored therein, the computer-readable program code portions comprising:
a first executable portion that recognizes identifying information of the hardware using the mobile user device, the mobile user device being separate from the hardware and the hardware being computer hardware;
a second executable portion that selects an appropriate action plan based on the recognized hardware and any service history including repairs previously associated with the hardware; wherein selecting the appropriate action plan further includes presenting, to the user, a list of recommended action plans including any previous action plans, and whether the previous action plans were successfully completed or failed, on the recognized hardware; and
a third executable portion that verifies the selected action plan against the hardware by presenting, to the user via graphical user interface (GUI), an illustrative step-by-step methodology for performing the services according to the selected action plan; wherein the user provides feedback to the processor for moving to a successive step of the methodology such that the mobile user device queries the user to input photographic evidence of completion of a respective step of the methodology prior to allowing the user to move to the successive step so as to mitigate user error thereby ensuring the selected action plan is performed accurately, and wherein the photographic evidence comprises a photo taken of the hardware by the user with a camera of the mobile user device upon completion of the respective step of the methodology such that the photo displays a last-action taken by the user on the hardware which is automatically compared, with no user input, to a pre-stored diagram to perform the verification, the positioning of the camera for taking the photo queried to the user as the user holds the mobile user device.

12. The computer program product of claim 11, further including a fourth executable portion that, pursuant to recognizing the identifying information, recognizes, by electronic, photographic, or optical character recognition (OCR) means, at least one of a serial number, a bar code, a radio frequency identification (RFID), a magnetic stripe, a smart card, and biometric data to identify the hardware in a database associated with the mobile user device.

13. The computer program product of claim 11, further including a fourth executable portion that, pursuant to recognizing the identifying information, recognizes, by photographic means, at least one physical identifying feature of the hardware using a pattern recognition process.

14. The computer program product of claim 11, further including a fourth executable portion that, pursuant to presenting the user the illustrative step-by-step methodology, performs an augmented reality function by photographically overlaying at least a portion of the illustrative methodology over at least a portion of an image of the hardware to assist the user in performing the services.

15. The computer program product of claim 14, further including a fifth executable portion that uses the augmented reality function to assist in performing the verification of the action plan against the hardware by comparing at least a portion of hardware images against saved graphical information of the hardware in which the services have been performed.

* * * * *